(12) United States Patent
Helal et al.

(10) Patent No.: US 7,386,066 B2
(45) Date of Patent: *Jun. 10, 2008

(54) METHOD AND DEVICE FOR DETECTING PULSES OF AN INCIDENT PULSE SIGNAL OF THE ULTRA WIDEBAND TYPE

(75) Inventors: Didier Helal, St. Julien en Genevois (FR); Thierry Arnaud, Poisy (FR); Fritz Lebowsky, Palo Alto, CA (US)

(73) Assignees: STMicroelectronics SA, Montrouge (FR); STMicroelectronics N.V., Amsterdam (NL)

( * ) Notice: Subject to any disclaimer, the term of this patent is extended or adjusted under 35 U.S.C. 154(b) by 988 days.

This patent is subject to a terminal disclaimer.

(21) Appl. No.: 10/256,282

(22) Filed: Sep. 26, 2002

(65) Prior Publication Data
US 2003/0086511 A1    May 8, 2003

(30) Foreign Application Priority Data
Sep. 27, 2001    (EP) ................... 01402497

(51) Int. Cl.
*H04L 27/06* (2006.01)
(52) U.S. Cl. .............. 375/340; 375/130; 375/150; 375/316; 375/367
(58) Field of Classification Search ............... 375/340; 324/309; 370/342, 484
See application file for complete search history.

(56) References Cited
U.S. PATENT DOCUMENTS

| | | | | |
|---|---|---|---|---|
| 3,588,714 A | * | 6/1971 | McIntosh | 327/166 |
| 3,980,945 A | * | 9/1976 | Bickford | 375/141 |
| 4,359,735 A | * | 11/1982 | Lewis et al. | 342/194 |
| 4,388,646 A | * | 6/1983 | Strother | 348/571 |
| 4,426,712 A | * | 1/1984 | Gorski-Popiel | 375/343 |
| 4,556,760 A | * | 12/1985 | Goldman | 455/436 |
| 5,304,908 A | * | 4/1994 | Oh | 318/629 |
| 5,347,645 A | * | 9/1994 | Perry | 713/502 |
| 5,371,540 A | * | 12/1994 | Tamura et al. | 348/222.1 |
| 5,486,830 A | * | 1/1996 | Axline et al. | 342/43 |
| 5,490,091 A | * | 2/1996 | Kogan et al. | 702/180 |
| 5,500,757 A | * | 3/1996 | De Blok | 398/202 |
| 5,544,080 A | * | 8/1996 | Kobayashi et al. | 700/280 |

(Continued)

OTHER PUBLICATIONS

Dickson et al., An Application Specific Integrated Circuit Implementation of a Multiple Correlator for UWB Radio Applications, Milcom 1999, IEEE Military Communications Conference Proceedings, (Cat. No. 99CH36341), Atlantic City, NJ, Oct. 31-Nov. 3, 1999, pp. 1207-1210, vol. 2, XP010369820.

(Continued)

*Primary Examiner*—David C. Payne
*Assistant Examiner*—Leon Flores
(74) *Attorney, Agent, or Firm*—Lisa K. Jorgenson; Allen, Dyer, Doppelt, Milbrath & Gilchrist, P.A.

(57) ABSTRACT

A detection device includes an antenna for receiving an incident signal, and for delivering a base signal. A comparator receives the base signal and provides an intermediate signal representative of the sign of the base signal relative to a reference signal. A sampling circuit samples the intermediate signal for providing a digital signal. A digital processing circuit correlates the digital signal with a predetermined correlation signal.

35 Claims, 9 Drawing Sheets

U.S. PATENT DOCUMENTS

| | | | | |
|---|---|---|---|---|
| 5,677,927 | A | | 10/1997 | Fullerton et al. ............ 375/200 |
| 5,832,035 | A | | 11/1998 | Fullerton ................... 375/210 |
| 5,877,802 | A | * | 3/1999 | Takahashi et al. ............ 348/71 |
| 5,901,172 | A | * | 5/1999 | Fontana et al. ............. 375/130 |
| 5,918,199 | A | * | 6/1999 | Yang et al. ................. 702/150 |
| 5,982,811 | A | * | 11/1999 | Harrison et al. ............ 375/150 |
| 6,028,887 | A | * | 2/2000 | Harrison et al. ............ 375/147 |
| 6,055,266 | A | * | 4/2000 | Nakamura .................. 375/140 |
| 6,061,134 | A | * | 5/2000 | Jensen et al. ............... 356/451 |
| 6,087,948 | A | * | 7/2000 | Oveby et al. ............... 340/635 |
| 6,094,458 | A | * | 7/2000 | Hellberg .................... 375/242 |
| 6,097,768 | A | * | 8/2000 | Janesch et al. ............. 375/330 |
| 6,186,949 | B1 | * | 2/2001 | Hatfield et al. ............. 600/443 |
| 6,201,986 | B1 | * | 3/2001 | Riederer et al. ............ 600/419 |
| 6,210,332 | B1 | * | 4/2001 | Chiao et al. ................ 600/443 |
| 6,456,221 | B2 | * | 9/2002 | Low et al. .................. 341/157 |
| 7,054,349 | B2 | * | 5/2006 | Cattaneo et al. ............. 375/130 |
| 2001/0053175 | A1 | * | 12/2001 | Hoctor et al. ............... 375/130 |
| 2002/0052239 | A1 | * | 5/2002 | Finn .......................... 463/40 |
| 2002/0122516 | A1 | * | 9/2002 | Kilani et al. ................ 375/354 |
| 2003/0058963 | A1 | * | 3/2003 | Cattaneo et al. ............ 375/316 |
| 2003/0227984 | A1 | * | 12/2003 | Batra et al. ................. 375/340 |

OTHER PUBLICATIONS

Win et al., Ultra-Wide Bandwidth Time-Hopping Spread-Spectrum Impulse Radio for Wireless Multiple-Access Communications, IEEE Transactions on Communications, New York, vol. 48, No. 4, Apr. 2000, pp. 679-691, XP000932191.

Bhushan et al.; "Photonic Sampling and Time Stretching for Analog-to-Digital Conversion", Jul. 27-28, 1999 Conference Publication No. 466 @ IEE 1999; p. 1-4.

Utata et al.; "High-Speed Sample and Hold Using Low Temperature Grown GaAs MSM Switches for Photonic A/D Conversion"; CLEO 2001, p. 66-67.

Walden; "Analog-to-Digital Converter Survey and Analysis", HRL Laboratories LLC, Malibu, CA; Publication No. XP-000824301; pp. 539-550.

Kahrs; "50 Years of RF and Microwave Sampling", Digital Object Identifier 10.1109/TMTT.2002.806934; IEEE Transactions on Microwave Theory and Techniques, vol. 51, No. 6, Jun. 2003; pp. 1787-1805.

* cited by examiner

METHOD AND DEVICE FOR DETECTING PULSES OF AN INCIDENT PULSE SIGNAL OF THE ULTRA WIDEBAND TYPE

FIELD OF THE INVENTION

The present invention relates to radio frequency technology of the ultra wideband (UWB) type, and more particularly, to the detection of pulses of an incident pulse signal of the ultra wideband type. The present invention can be applied in a number of domains, such as wireless local communication networks, and traffic regulation and collision prevention, particularly in the automotive field.

BACKGROUND OF THE INVENTION

Ultra wideband technology is distinguished from narrowband and spread spectrum technologies in the sense that the bandwidth of an ultra wideband type signal is typically between about 25% to 100% of the central frequency. Moreover, instead of transmitting a continuous carrier modulated with information or with information combined with a spreading code, which determines the bandwidth of the signal, ultra wideband technology involves transmission of a series of very narrow pulses. For example, these pulses may take the form of a single cycle having a pulse width of less than 1 ns. These pulses are extremely short in the time domain, and when transformed into the frequency domain, lead to the obtaining of the ultra wideband spectrum that is characteristic of UWB technology.

In UWB technology, the information on the signal can be coded, for example, by a modulation technique called pulse position modulation (PPM). In other words, the information coding is carried out by varying the instant of transmission of individual pulses. More specifically, the pulse train is transmitted at a frequency of repetition that can extend up to several tens of MHz. Each pulse is transmitted in a window of predetermined length, for example 50 ns. Compared to a theoretical position of transmission, the pulse is then ahead or delayed, enabling a 0 or a 1 to be coded. More than two values can also be coded using more than two positions offset relative to the reference position. It is even possible to superimpose a BPSK type modulation onto this position modulation.

On receiving the transmitted signal, these pulses must therefore be detected for determining, if necessary, their position if a PPM type modulation has been used. Until now, this detection of pulses is carried out using an analog correlator, which requires a relatively complex hardware implementation.

SUMMARY OF THE INVENTION

In view of the foregoing background, an object of the present invention is to provide a device for detecting pulses of an incident pulse signal of the ultra wideband type. The device preferably comprises input means, such as an antenna for example, to receive the incident signal and to deliver a base signal. Preprocessing means receives the base signal and delivers an intermediate signal representative of the sign of the base signal relative to a reference, such as zero voltage for example. The device further comprises means of sampling the intermediate signal for delivering a digital signal, and digital processing means for correlating the digital signal with a predetermined correlation signal.

The invention enables an ultra wideband type pulse to be detected using the sign of the received signal, which is sampled and then correlated with a predetermined digital correlation signal. This detection will enable, in some applications, processing operations of synchronization, channel estimation and decoding of a UWB signal carrying coded information.

In addition to the use of a binary signal representative of the sign of the incident signal for detecting pulses, the invention provides for all the processing, and in particular, the detection of pulses, to be carried out digitally. This simplifies the hardware implementation of the device.

Furthermore, in the prior art, which uses an analog approach, either the information located outside of the instants of capture is lost (for example, in the case of position modulation), or the pulses are detected globally (for example, in the case of a BPSK modulation). However, according to the invention, it is possible to perform a continuous sampling of the sign of the signal with a finer resolution than the width of the pulses and to choose the best instants to carry out the digital processing, and in particular, the correlation.

In addition, in wireless communication networks domains, the terminals generally use Rake receivers. This term is well known to the person skilled in the art, and includes several fingers assigned to the various paths of a multi-path transmission channel.

Therefore, when an analog approach is used for detecting UWB pulses, parts of the receive chain must then be duplicated as many times as there are fingers. However, according to the invention, the continuous sampling of the sign of the signal allows for a continuous observation of the signal and multiple paths can then be detected in a multi-path environment without duplicating the receive chain.

According to one embodiment of the invention, the sampling means comprises serial-to-parallel conversion means for successively delivering at a predetermined delivery frequency Fe, groups of N samples in parallel, which corresponds to an effective frequency of sampling of the intermediate signal equal to N*Fe.

By way of example, when the pulses have a central frequency of a few GHz, the effective sampling frequency can be greater than 10 GHz. In addition, the fact that serial-to-parallel conversion means are used means that a clock signal at frequency Fe, for example a few hundred MHz, can be used and an effective sampling frequency on the order of 20 GHz, or even higher, can be obtained. Current analog-to-digital converters cannot achieve this. In practice, N may be an integer power of 2, for example equal to 7.

The serial-to-parallel conversion means advantageously comprises a programmable clock circuit receiving a base clock signal having the frequency Fe and delivering N elementary clock signals all having the same frequency Fe but temporally offset by 1/N*Fe with respect to each other. N flip-flops receive at the input the intermediate signal, respectively controlled by the N elementary clock signals, and respectively delivering N samples. An output register is controlled by the base clock signal to store the N samples delivered by the N flip-flops, and delivers them in parallel at the delivery frequency.

The programmable clock circuit preferably comprises a digital phase-locked loop including a programmable ring oscillator delivering the N elementary clock signals, and is controlled from a control circuit receiving the respective outputs of N flip-flops. These N flip-flops receive the base clock signal and are respectively controlled by the N elementary clock signals.

The use of a digital phase-locked loop combined with the serial-to-parallel conversion means allows a precision greater than a few tens of picoseconds to be obtained for the mutual phase shifts (mutual offsets in the time domain) of the N elementary clock signals. Thus, according to the invention, it is possible to detect the instant of arrival of a pulse with a resolution equal to the precision of the N elementary clock signals.

The sampling means, and in particular the digital phase-locked loop, are advantageously implemented in CMOS technology. This allows the sampling means and the digital processing means to be placed in a standby mode for predetermined time intervals. In other words, the system can easily be switched on and off, resulting in significant power savings.

As indicated above, the pulses are detected by a correlation of the digital signal delivered by the sampling means with a predetermined correlation signal. This correlation signal can be the digital signal itself. In other words, an autocorrelation of the digital signal is then carried out. Hence, unknown pulse shapes can be detected.

With this being the case, when the incident signal results from the transmission of an initial pulse signal comprising pulses of known theoretical shape, the correlation signal is then advantageously a digital reference signal corresponding to a theoretical base signal arising from the reception of a theoretical pulse having the known shape.

Pulses having a known shape can then be detected using a correlation with a reference corresponding to the theoretical response of the system to the received pulse. When the received signal comprises a symbol made up of several pulses, the correlation signal can then advantageously be the theoretical response of the system to the received symbol. Regardless of the correlation signal used, it is particularly advantageous, especially for suppressing noise, that the digital processing means additionally carry out a series of coherent integrations of the digital signal.

Another aspect of the present invention is directed to a method for detecting pulses of an incident pulse signal of the ultra wideband type. The method preferably comprises the incident signal being received in such a way as to obtain a base signal, and an intermediate signal representative of the sign of the base signal is sampled so as to obtain a digital signal. A digital processing of the digital signal comprises a correlation of the digital signal with a predetermined correlation signal.

The sampling preferably comprises a serial-to-parallel conversion for successively delivering at a predetermined delivery frequency Fe, groups of N samples in parallel. This corresponds to an effective frequency of sampling of the intermediate signal equal to N*Fe.

Another aspect of the present invention is directed to a terminal of a wireless transmission system incorporating a detection device as defined above.

BRIEF DESCRIPTION OF THE DRAWINGS

Other advantages and characteristics of the invention will become apparent upon examination of the detailed description of embodiments and methods of implementation, which are non-limiting, and of the appended drawings, in which.

DETAILED DESCRIPTION OF THE PREFERRED EMBODIMENTS

Figure 1:
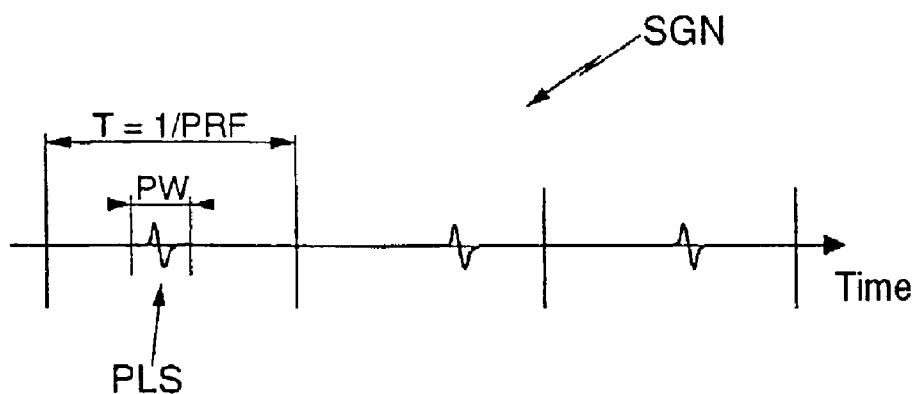
FIG. 1 illustrates an incident signal of the ultra wideband type in accordance with the present invention.

In FIG. 1, the reference SGN designates an initial pulse signal of the ultra wideband type, comprising pulses PLS having a known theoretical shape. More specifically, these pulses PLS have a predetermined time-domain width PW, which is typically less than 1 ns, and on the order of 360 picoseconds for example. The successive pulses PLS are respectively contained in successive time windows of length T equal to the inverse of the pulse repetition frequency (PRF). As a guide, the length T of each time window is equal to 50 ns for example. The position of each pulse in a time window can vary from one window to another according to a code, such as a pseudo-random code, for example. Moreover, when the signal carries information coded with a position modulation (PPM), the pulse can be slightly ahead or slightly delayed relative to the reference position of the pulse in the window, depending on the value 0 or 1 of the information transmitted.

The pulses PLS have characteristics of an ultra wideband type pulse in the sense that the ratio of the bandwidth of the pulse at half-power to the central frequency is greater than ¼. As a guide, the central frequency of a pulse can vary between 2 and 4 GHz.

Figure 4:
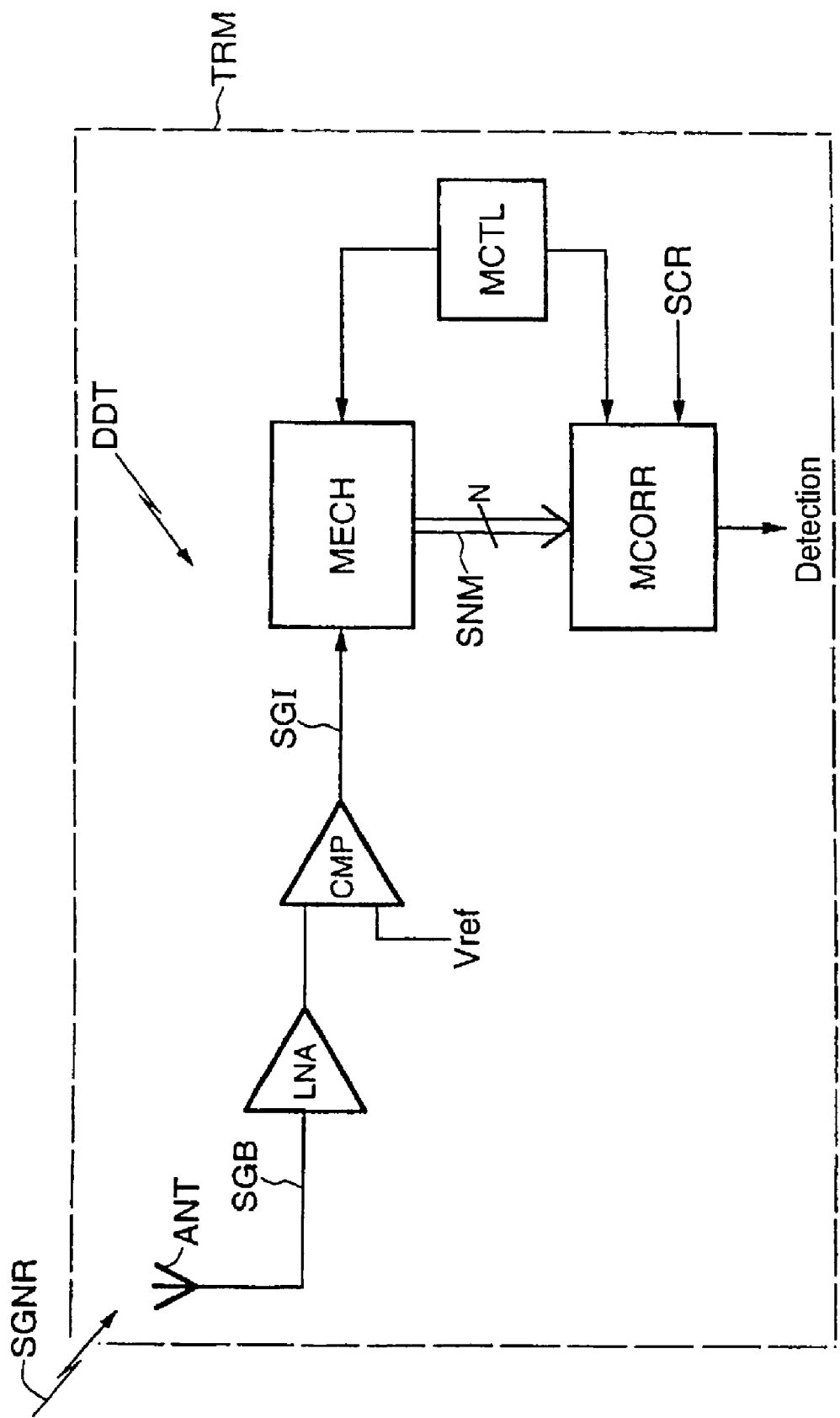
FIG. 4 schematically illustrates one embodiment of a detection device in accordance with the present invention.

The detection device DDT according to the invention, an embodiment of which is illustrated in FIG. 4, will enable the presence or absence of pulses in the signal to be detected. When a pulse is present, the detection device DDT will detect its instant of arrival and its polarity. This device can, for example, be incorporated in a terminal TRM of a local area network type wireless communication system.

Figure 2:
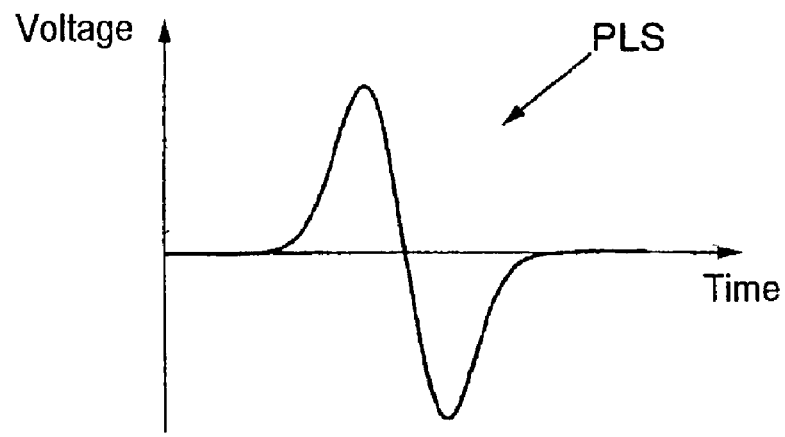
FIG. 2 illustrates in more detail one of the pulses of the incident signal illustrate in FIG. 1.
Figure 3:
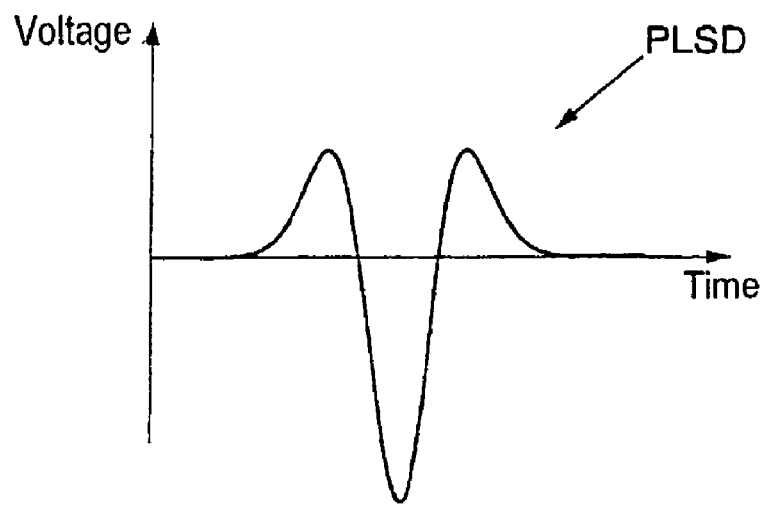
FIG. 3 illustrates in more detail one of the pulses of the base signal resulting from the reception of the incident signal by the reception system in accordance with the present invention.

More specifically, the device DDT includes in particular, but non-limiting, an antenna ANT to receive the incident signal SGNR resulting from the transmission of the signal SGN over a transmission channel which may be a multi-path channel. The antenna ANT forms the input which delivers a base signal SGB from the incident signal SGNR. The base signal SGB is also a pulse signal of the ultra wideband type. However, after passing through the antenna ANT, the shape of the pulses PLSD making up this signal SGB, as illustrated in FIG. 3, is different from the shape of the pulses PLS illustrated in FIG. 2.

In other words, the pulse PLSD is the theoretical response of the system receiving a pulse PLS. Of course, this theoretical response varies according to the characteristics of the reception. The base signal SGB is then amplified using low noise amplification means LNA. The output signal of the amplifier LNA is then compared with a reference voltage Vref (for example, the value zero) in a comparator CMP. The comparator CMP then delivers an intermediate signal SGI representative of the sign of the base signal SGB, and consequently of the sign of the incident signal relative to the reference Vref.

The intermediate signal SGI will then be sampled in sampling means MECH. This sampling means MECH, as will be seen in more detail below, will deliver successive groups of N samples. All these samples will then be processed in the digital processing means. The digital processing means includes essentially correlation means MCORR for performing a correlation of the digital signal SNM delivered by the sampling means with a predetermined digital correlation signal SCR. The result of this correlation will enable the possible presence of a pulse to be detected.

Figure 5:
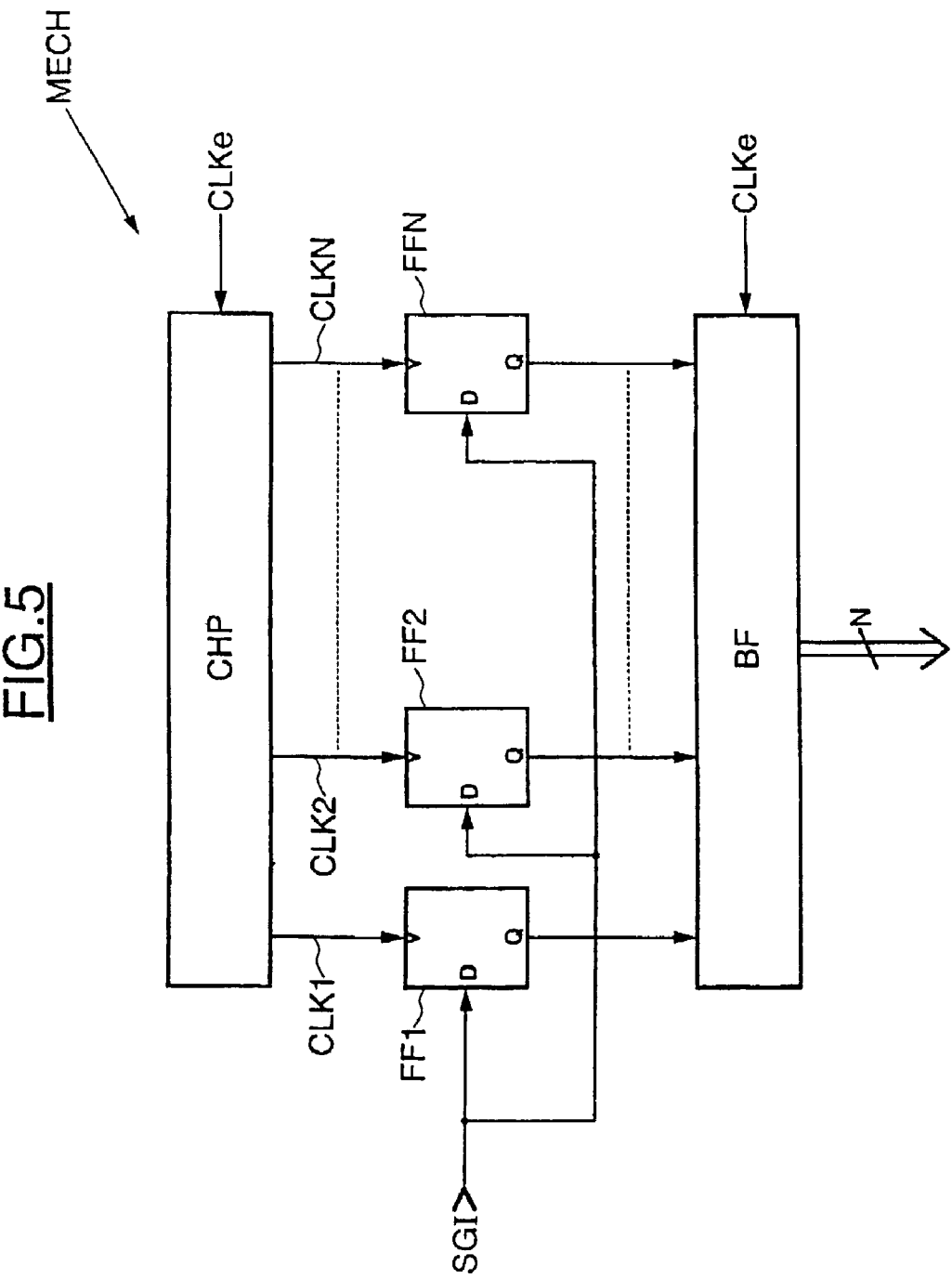
FIGS. 5 and 6 schematically illustrate in more detail one embodiment of the sampling means illustrated in FIG. 4.

Since the central frequency of the pulses of the signal can be on the order of several GHz, the sampling frequency of the digital signal must be very high, that is, greater than 10 GHz for example. A method which is particularly straightforward to implement for sampling a signal at 10 GHz may involve using serial-to-parallel conversion means, as illustrated in FIG. 5.

More specifically, the serial-to-parallel conversion means will successively deliver at a predetermined delivery frequency Fe, on the order of 200 MHz for example, groups of N samples in parallel. This will correspond to an effective sampling frequency of the intermediate signal equal to N*Fe. Thus, N can be chosen to be equal to $2^m$ for example, where m may be equal to 7 for example. This then leads to groups of 128 samples being obtained. The effective sampling frequency will then be greater than 20 GHz.

In terms of hardware, the serial-to-parallel conversion means includes a programmable clock circuit CHP receiving a base clock signal CLKe having the frequency Fe and delivering N elementary clock signals CLK1-CLKN all having the same frequency Fe but offset temporally by 1/N*Fe with respect to each other. Thus, as a guide, these clock signals may be offset temporally with respect to each other by about 50 picoseconds, for example.

The serial-to-parallel conversion means also includes N D-type flip-flops, respectively referenced FF1-FFN. These flip-flops are respectively controlled by N elementary clock signals CLK1-CLKN, and they all receive at their input the intermediate signal SGI from the comparator CMP.

The intermediate signal SGI will therefore be sampled or in synch with the successive rising edges of the various elementary clock signals CLK1-CLKN. The N successive samples will be stored in an output register BF controlled by the base clock signal CLKe. At each rising edge of this base clock signal CLKe, the N samples will be delivered in parallel. The rising edges are spaced by an interval Te representing the period of the base clock signal.

Figure 7:
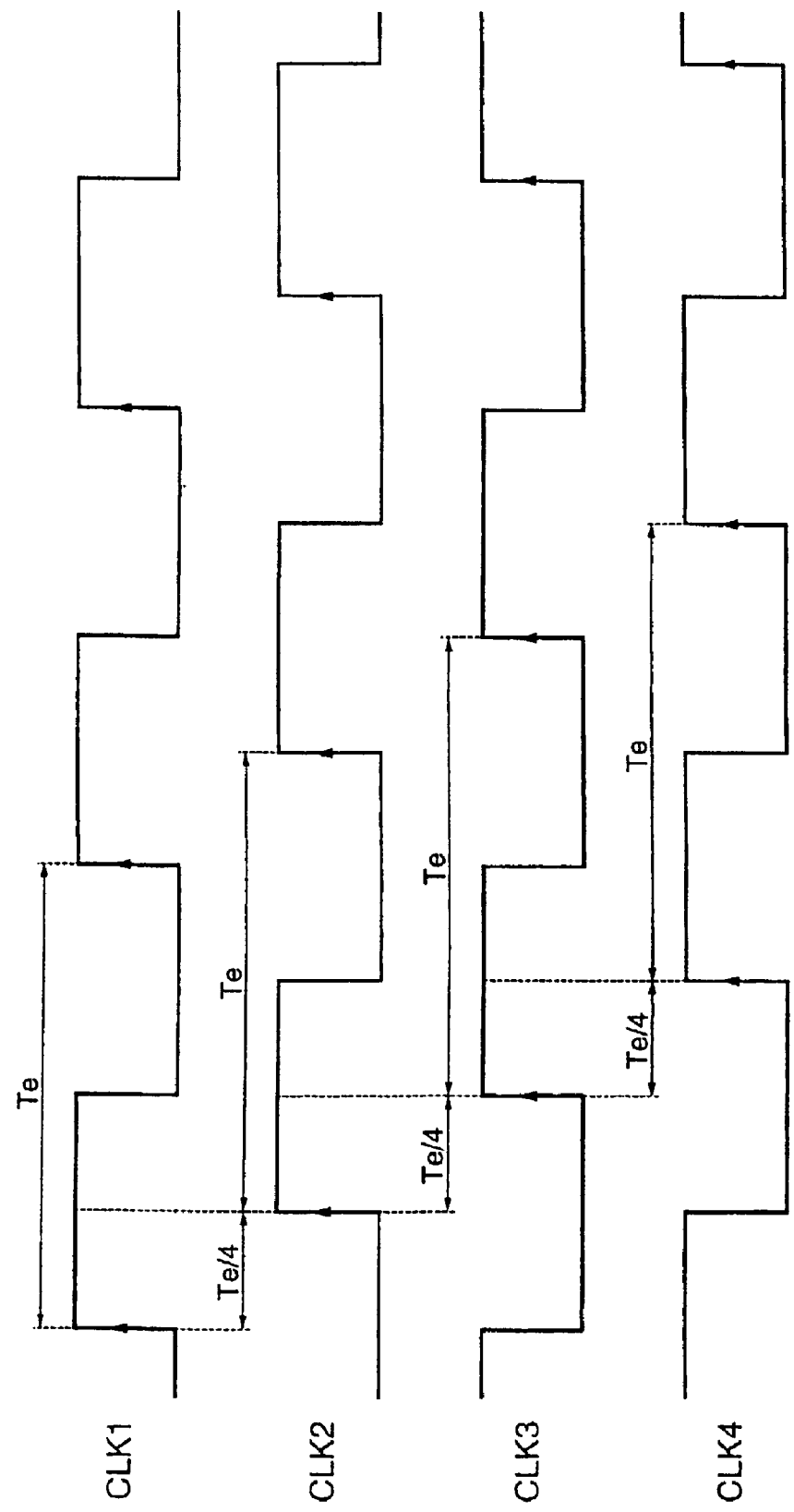
FIG. 7 is a timing diagram of the various clock signals used in the sampling means in accordance with the present invention.

By way of example, FIG. 7 can be referred to, in which, for simplicity, only four elementary clock signals CLK1-CLK4 (corresponding to N=4) have been represented. As can be seen in FIG. 7, the base clock signal CLKe is one of the elementary clock signals, for example the signal CLK1.

The programmable clock circuit CHP can be made up of a clock, for example a quartz clock, and a certain number of delay elements assembled in series at the output of the clock. The person skilled in the art may, if necessary, refer to European Patent Application No. 843,418.

Figure 6:
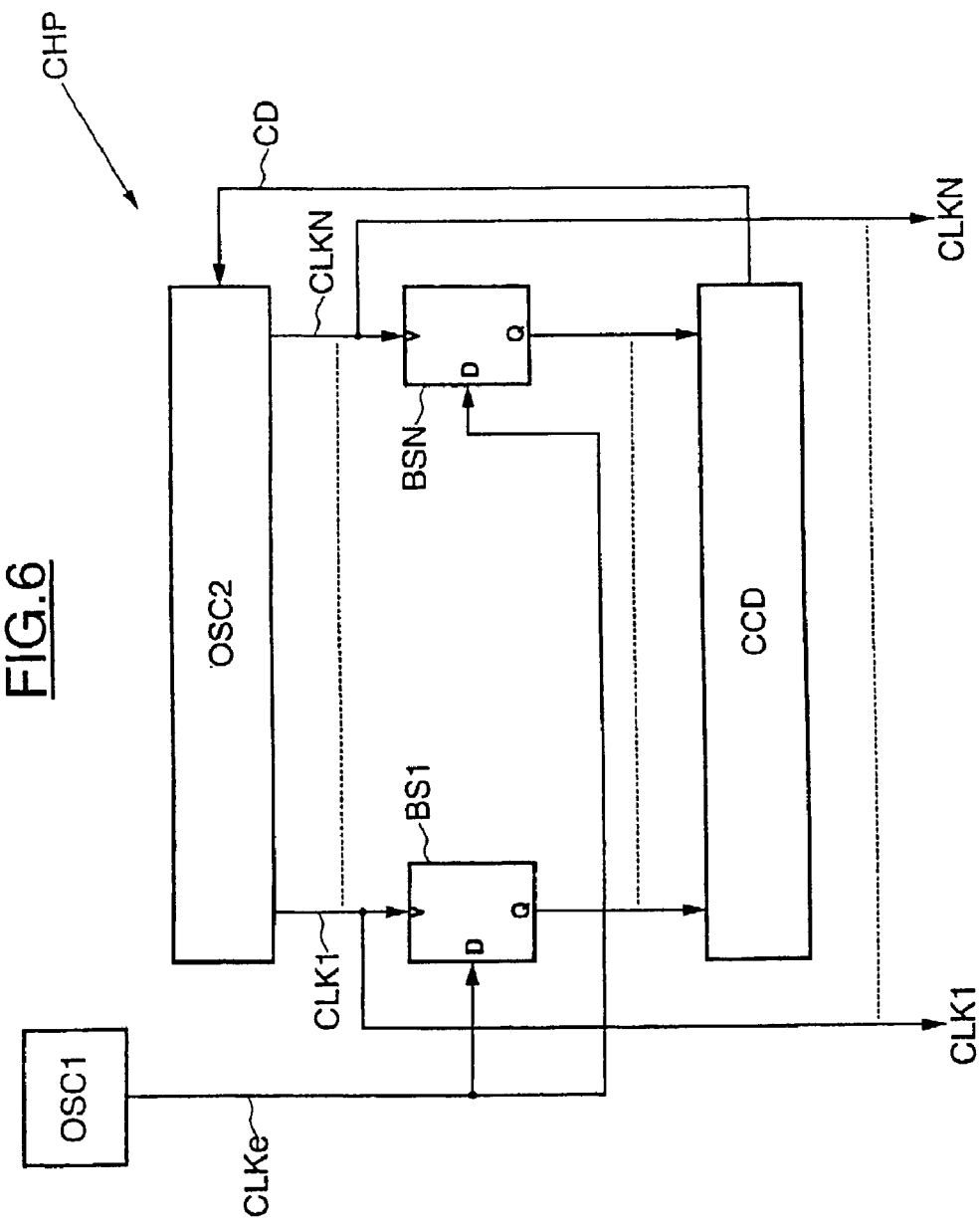

One of the problems of this very high frequency sampling lies in the fact that the elementary clock signals should be delivered with a very low jitter, for example on the order of a few picoseconds. This is the reason why it is therefore advantageous that the programmable clock circuit CHP comprises a digital phase-locked loop that includes (FIG. 6), for example, a programmable ring oscillator OSC2 delivering the N elementary clock signals CLK1-CLKN. This ring oscillator is controlled from a control circuit CCD receiving the respective outputs of N flip-flops BS1-BSN. These N flip-flops are respectively controlled by the N elementary clock signals CLK1-CLKN and receive on their D input the base clock signal CLKe from a conventional quartz oscillator OSC1 for example.

The person skilled in the art may refer, if necessary, to U.S. Pat. No. 6,208,182, particularly for the ring oscillator. Nevertheless, the general principles thereof will now be reviewed. The control circuit CCD includes means for comparing samples two by two, for determining if a state transition has occurred in an interval of time separating the two samples.

This comparison is made over at least two cycles, which may or may not be consecutive, of the ring oscillator. This comparison is carried out in such a way that if during the second cycle a comparable state transition is detected in the same interval, the control of the ring oscillator is not modified. If during the second cycle a comparable state transition is detected in a later interval, the period of the ring oscillator is reduced. If during the second cycle a comparable state transition is detected in an earlier interval, the period of the ring oscillator is increased.

Figure 9:
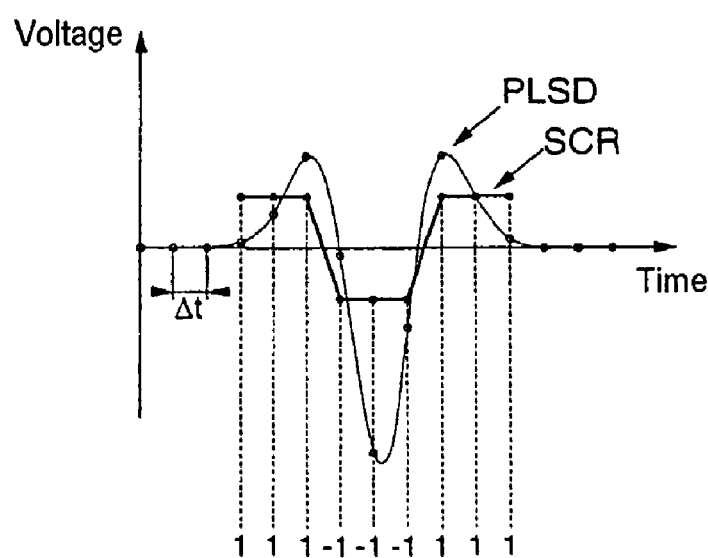
FIG. 9 illustrates a reference correlation signal in accordance with the present invention.

As indicated above, detecting the possible presence of a pulse will be carried out by a digital correlation with a reference correlation signal SCR. In the example described and because the pulses have a known shape, the reference correlation signal is a digital reference signal corresponding to the shape of a pulse after it has passed through the input means. More specifically, as illustrated in FIG. 9, the digital reference signal SCR is a profile of nine samples for which the general shape corresponds to the general shape of a pulse PLSD. Each sample is separated in time by a distance $\Delta t=1/N*Fe$. The reference signal SCR is therefore, in this case, a block of nine samples respectively having values 111-1-1-1-111.

The correlation means MCORR will then perform a sliding correlation between the digital signal samples delivered by the sampling means and the N2 (N2=9) reference samples. In practice, N2 is far less than N. The correlation means will therefore first perform a first correlation (which is a term-by-term multiplication) between the N2 reference samples and the N2 first samples of the group of N samples delivered by the sampling means. This will give a first correlation value. Then, every $\Delta t$, the N2 reference samples will shift by one sample in such a way that a new correlation value is obtained.

Figure 8:
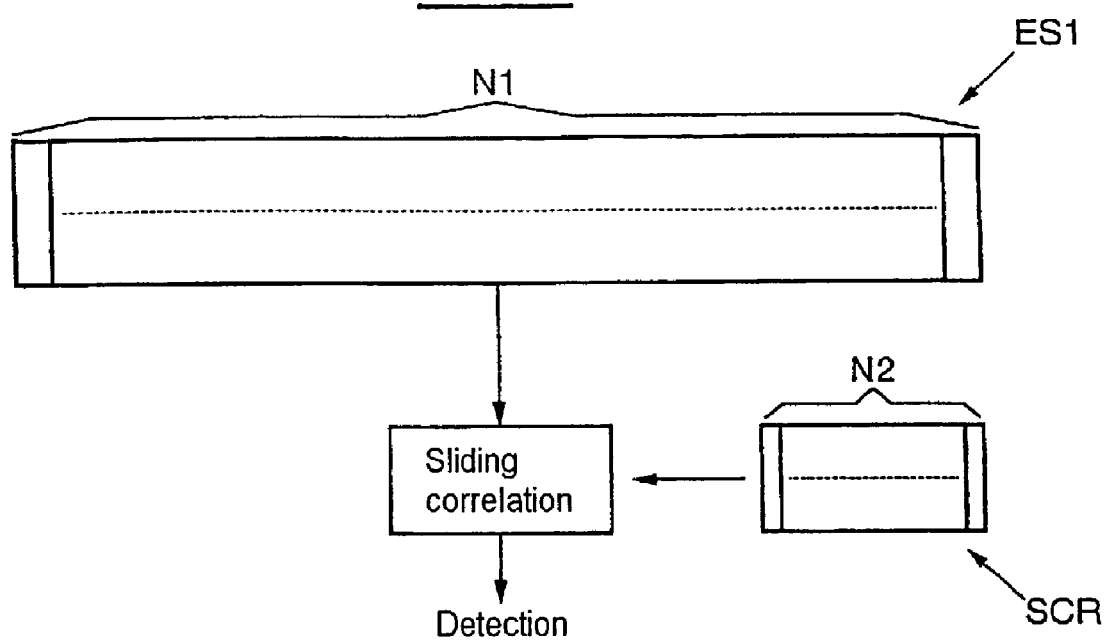
FIG. 8 illustrates a first embodiment and method of implementation of the invention using a reference correlation signal.

In addition, this sliding correlation will be performed over a set ES1 of N1 samples of the digital signal (FIG. 8). The value N1 corresponds to the number of samples in the length T of a window of the base signal within which a pulse may be located.

The digital processing means will then detect the maximum among the correlation values, and this will enable the presence and instant of arrival of the pulse to be detected. Moreover, depending on the sign of this maximum value, the polarity of the received pulse may be determined. As an alternative, it is possible to detect only the zero-crossing of the set of correlation values.

Figure 10:
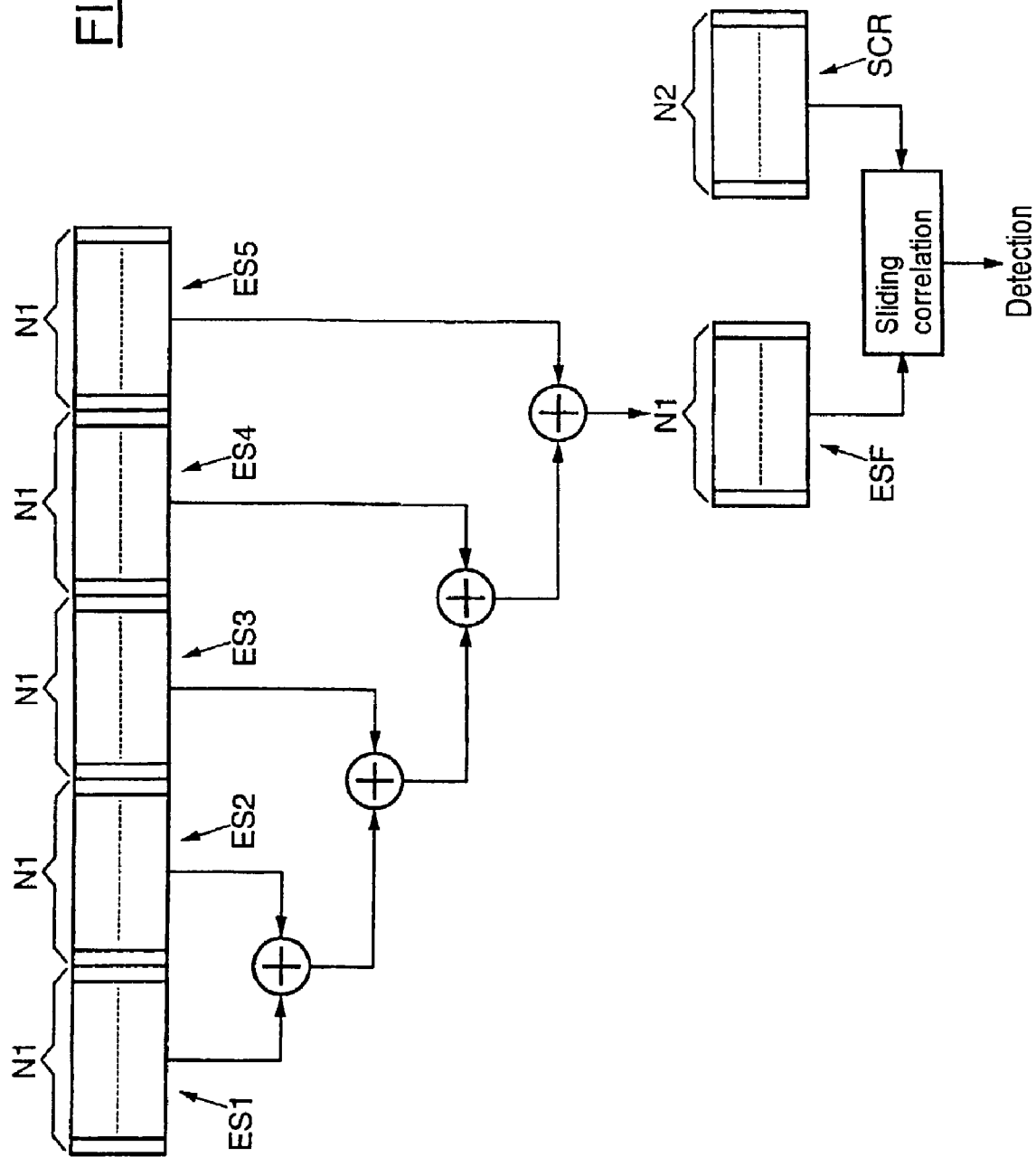
FIG. 10 illustrates a second embodiment and method of implementation of the invention also using a reference correlation signal.

With this being the case, the signal SGNR which arrives on the antenna is noisy. This is why it is preferable that the digital processing means additionally performs a series of coherent integrations of the digital signal. These coherent integrations are very well known by the person skilled in the art. As illustrated in FIG. 10, they may involve performing summations of common samples of several successive sets of N1 samples ES1-ES5, so as to obtain in the end a final set ESF of N1 samples on which the sliding correlation will be performed using the N2 reference samples. If the successive pulses are spaced irregularly in time (for example, according to a known code), the summations of samples can take account of the time-domain offset between the pulses.

In the example just described, it has been assumed that the pulses of the incident signal were of a known shape. With this being the case, the invention also enables the presence of pulses of a pulse signal of the ultra wideband type to be detected, whatever the shape of the pulses may be even if the pulses are, a priori, of unknown shape. In this case, the reference correlation signal SCR will be the digital signal itself. In other words, the correlation means MCORR will perform an autocorrelation of the digital signal delivered by the sampling means. Furthermore, detection of the correlation peak will enable the possible presence of pulses and the time-domain gap between the pulses to be detected.

Figure 11:
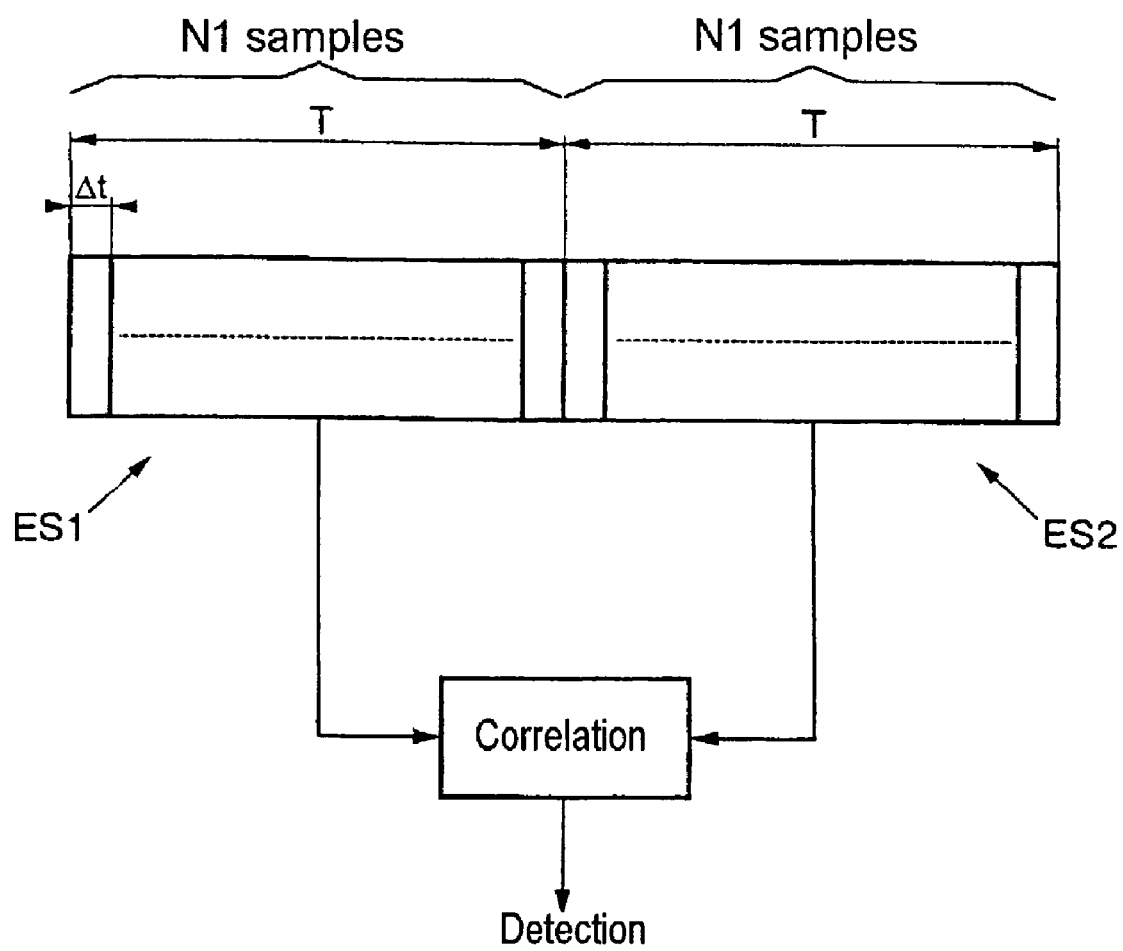
FIGS. 11 and 12 illustrate two other embodiments and methods of implementation in accordance with the present invention.

As illustrated in FIG. 11, this autocorrelation will be performed on two consecutive sets ES1 and ES2 of N1 samples of the digital signal. It is recalled here that these N1 samples correspond to a length T of the window of the signal within which the pulse may be located. Moreover, each sample is spaced at the distance Δt.

Figure 12:
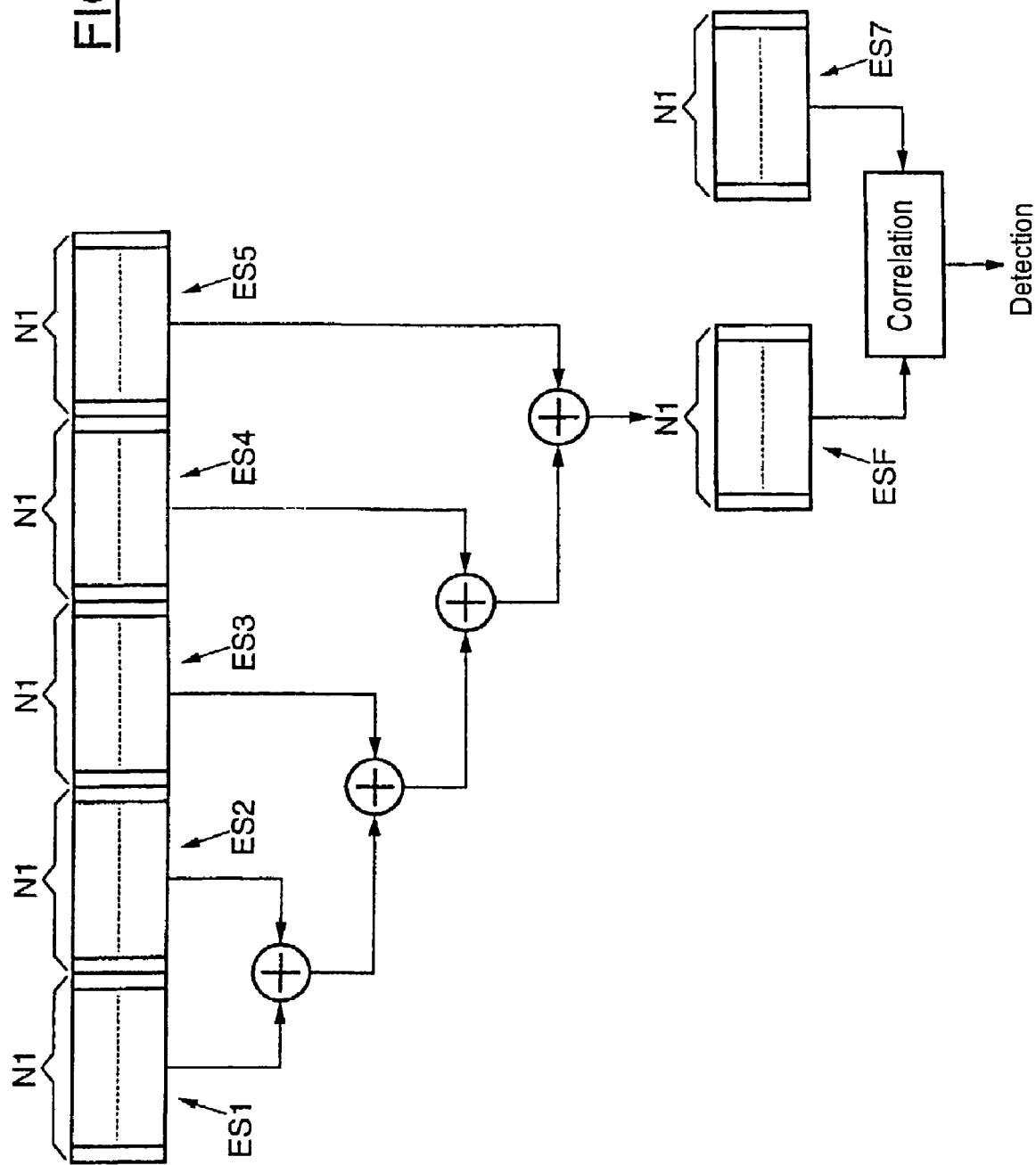

In this case also, as illustrated in FIG. 12, to take account of the noise it is preferable to perform a series of coherent integrations of the digital signal. These can be performed on a consecutive number of sets ES1-ES5 of N1 samples so as to obtain a final set ESF of N1 samples which will be correlated with another set ES7 of N1 samples.

In terms of hardware, the sampling means and the digital processing means can be implemented in CMOS technology, which is appreciable from the point of view of manufacturing costs. This technology can also be used to provide control means MCTL (FIG. 4) which will be able to place the sampling means and/or the correlation means in a standby state, for example during periods of time when the system knows it is receiving no pulses or even during periods when the signal/noise ratio is not optimal. This leads to an appreciable power saving.

Furthermore, the correlation means can be implemented by several correlators in parallel for parallel processing several groups of N samples so as to obtain a processing speed compatible with the effective sampling frequency equal to N*Fe.

That which is claimed is:

1. A method for detecting ultra wideband pulses of an incident pulse signal, the method comprising:
receiving the incident pulse signal and providing a base signal based upon the incident pulse signal;
providing an intermediate signal representative of a sign of the base signal relative to a reference signal;
sampling the intermediate signal for providing a digital signal, the sampling comprising a serial-to-parallel conversion for successively delivering at a deliver frequency Fe groups of N samples in parallel, the delivery frequency Fe corresponding to an effective sampling frequency of the intermediate signal equal to N*Fe; and
digitally processing the digital signal by correlating the digital signal with a correlation signal for detecting pulses of the received incident pulse signal.

2. A method according to claim 1, wherein the pulses of the incident pulse signal have a central frequency within a range of 2 to 4 GHz; and wherein the effective sampling frequency is greater than 10 GHz.

3. A method according to claim 2, wherein N is an integer power of 2; and wherein the effective sampling frequency is 20 GHz, with the delivery frequency Fe is 200 MHz.

4. A method according to claim 1, wherein the correlation signal is the same as the digital signal.

5. A method according to claim 4, wherein the pulses of the incident pulse signal are respectively contained in successive time windows of length T, this length corresponding to a window of N1 samples of the digital signal; and wherein the correlating is between a first set of N1 samples of the digital signal and a second set of N1 samples of the digital signal.

6. A method according to claim 1, wherein the incident pulse signal results from transmission of an initial pulse signal comprising pulses having a theoretical shape; and wherein the correlation signal comprises a reference correlation signal corresponding to a theoretical base signal arising from reception of a theoretical pulse having the theoretical shape.

7. A method according to claim 6, wherein the reference correlation signal is made up of N2 reference samples; and wherein the correlating comprises a sliding correlation between the samples of the digital signal and the N2 reference samples.

8. A method according to claim 1, further comprising performing a series of coherent integrations of the digital signal.

9. A device for detecting ultra wideband pulses of an incident pulse signal, the device comprising:
input means for receiving the incident pulse signal and providing a base signal based upon the incident pulse signal;
preprocessing means connected to said input means for providing an intermediate signal representative of a sign of the base signal relative to a reference signal, and having a first input for receiving the base signal and a second input for receiving the reference signal;
sampling means connected to said preprocessing means for sampling the intermediate signal for providing a digital signal; and
digital processing means connected to said sampling means for correlating the digital signal with a correlation signal, the correlation signal being the same as the digital signal, the pulses of the incident pulse signal being respectively contained in successive time windows of length T, with this length corresponding to a window of N1 samples of the digital signal provided by said sampling means, the correlating being between a first set of N1 samples of the digital signal and a second set of N1 samples of the digital signal.

10. A device according to claim 9, wherein said sampling means is based upon a serial-to-parallel conversion for successively delivering at a delivery frequency Fe groups of N samples in parallel, the delivery frequency Fe corresponding to an effective sampling frequency of the intermediate signal equal to N*Fe.

11. A device according to claim 10, wherein said sampling means comprises:
   a programmable clock circuit for receiving a base clock signal having the delivery frequency Fe, and for providing N elementary clock signals all having the delivery frequency Fe but temporally offset by 1/N*Fe with respect to each other;
   a first set of N flip-flops connected to said programmable clock circuit and having respective inputs for receiving the intermediate signal, with each flip flop being controlled by a respective elementary clock signal, and said first set of N flip-flops providing N samples; and
   an output register connected to said first set of N flip-flops and being controlled by the base clock signal for storing the N samples, and for providing the N samples in parallel at the delivery frequency.

12. A device according to claim 11, wherein said programmable clock circuit comprises a digital phase-locked loop comprising:
   a programmable ring oscillator for providing the N elementary clock signals;
   a second set of N flip-flops connected to said programmable ring oscillator and having respective inputs for receiving the base clock signal, with each flip-flop being controlled by a respective elementary clock signal; and
   a control circuit connected to said second set of N flip-flops for receiving respective outputs therefrom.

13. A device according to claim 10, wherein the pulses of the incident pulse signal have a central frequency within a range of 2 to 4 GHz; and wherein the effective sampling frequency is greater than 10 GHz.

14. A device according to claim 13, wherein N is an integer power of 2; and wherein the effective sampling frequency is 20 GHz, with the delivery frequency Fe is 200 MHz.

15. A device according to claim 9, wherein said sampling means is implemented in CMOS technology.

16. A device according to claim 9, further comprising control means for placing said sampling means and said digital processing means into a standby mode during predetermined time intervals.

17. A device according to claim 9, wherein the incident pulse signal results from transmission of an initial pulse signal comprising pulses having a theoretical shape; and wherein the correlation signal comprises a reference correlation signal corresponding to a theoretical base signal arising from reception of a theoretical pulse having the theoretical shape.

18. A device according to claim 17, wherein the reference correlation signal is made up of N2 reference samples; and wherein the correlating comprises a sliding correlation between the samples of the digital signal and the N2 reference samples.

19. A device according to claim 18, wherein said digital processing means additionally performs a series of coherent integrations of the digital signal.

20. A terminal for detecting ultra wideband pulses of an incident pulse signal, the terminal comprising:
   an antenna for receiving the incident pulse signal and providing a base signal based upon the incident pulse signal, the incident pulse signal resulting from transmission of an initial pulse signal comprising pulses having a theoretical shape;
   an amplifier connected to said antenna for providing an intermediate signal representative of a sign of the base signal relative to a reference signal;
   a sampling circuit connected to said amplifier for sampling the intermediate signal for providing a digital signal; and
   a digital processing circuit connected to said sampling circuit for correlating the digital signal with a correlation signal, the correlation signal comprising a reference correlation signal corresponding to a theoretical base signal arising from reception of a theoretical pulse having the theoretical shape, the reference correlation signal being made up of N2 reference samples, and the correlating comprising a sliding correlation between the samples of the digital signal and the N2 reference samples.

21. A terminal according to claim 20, wherein said sampling circuit is based upon a serial-to-parallel conversion for successively delivering at a delivery frequency Fe groups of N samples in parallel, the delivery frequency Fe corresponding to an effective sampling frequency of the intermediate signal equal to N*Fe.

22. A terminal according to claim 21, wherein said sampling circuit comprises:
   a programmable clock circuit for receiving a base clock signal having the delivery frequency Fe, and for providing N elementary clock signals all having the delivery frequency Fe but temporally offset by 1/N*Fe with respect to each other;
   a first set of N flip-flops connected to said programmable clock circuit and having respective inputs for receiving the intermediate signal, with each flip flop being controlled by a respective elementary clock signal, and said first set of N flip-flops providing N samples; and
   an output register connected to said first set of N flip-flops and being controlled by the base clock signal for storing the N samples provided by said first set of N flip-flops, and for providing the N samples in parallel at the delivery frequency.

23. A terminal according to claim 22, wherein said programmable clock circuit comprises a digital phase-locked loop comprising:
   a programmable ring oscillator for providing the N elementary clock signals;
   a second set of N flip-flops connected to said programmable ring oscillator and having respective inputs for receiving the base clock signal, with each flip-flop being controlled by a respective elementary clock signal; and
   a control circuit connected to said second set of N flip-flops for receiving respective outputs therefrom.

24. A terminal according to claim 21, wherein the pulses of the incident pulse signal have a central frequency within a range of 2 to 4 GHz a few GHz; and wherein the effective sampling frequency is greater than 10 GHz.

25. A terminal according to claim 24, wherein N is an integer power of 2; and wherein the effective sampling frequency is 20 GHz, with the delivery frequency Fe is 200 MHz.

26. A terminal according to claim 20, further comprising a control circuit for placing said sampling circuit and said digital processing circuit into a standby mode during predetermined time intervals.

27. A terminal according to claim 20, wherein the correlation signal is the same as the digital signal.

28. A terminal according to claim 27, wherein the pulses of the incident pulse signal are respectively contained in successive time windows of length T, this length corresponding to a window of N1 samples of the digital signal provided by said sampling circuit; and wherein the correlating is between a first set of N1 samples of the digital signal and a second set of N1 samples of the digital signal.

29. A terminal according to claim 20 wherein said digital processing circuit additionally performs a series of coherent integrations of the digital signal.

30. A terminal according to claim 20, wherein the incident pulse signals are generated by a wireless transmission system.

31. A device for detecting ultra wideband pulses of an incident pulse signal, the device comprising:
- an input for receiving the incident pulse signal and providing a base signal based upon the incident pulse signal;
- a preprocessor coupled to said input for providing an intermediate signal representative of a sign of the base signal relative to a reference signal, and having a first input for receiving the base signal and a second input for receiving the reference signal;
- a sampler coupled to said preprocessor for sampling the intermediate signal for providing a digital signal, and operating based upon a serial-to-parallel conversion for successively delivering at a delivery frequency Fe groups of N samples in parallel, the delivery frequency Fe corresponding to an effective sampling frequency of the intermediate signal equal to N*Fe; and
- a digital processor coupled to said sampler for correlating the digital signal with a correlation signal.

32. A device according to claim 31, wherein said sampler comprises:
- a programmable clock circuit for receiving a base clock signal having the delivery frequency Fe, and for providing N elementary clock signals all having the delivery frequency Fe but temporally offset by 1/N*Fe with respect to each other;
- a first set of N flip-flops coupled to said programmable clock circuit and having respective inputs for receiving the intermediate signal, with each flip flop being controlled by a respective elementary clock signal, and said first set of N flip-flops providing N samples; and
- an output register coupled to said first set of N flip-flops and being controlled by the base clock signal for storing the N samples, and for providing the N samples in parallel at the delivery frequency.

33. A device according to claim 32, wherein said programmable clock circuit comprises a digital phase-locked loop comprising:
- a programmable ring oscillator for providing the N elementary clock signals;
- a second set of N flip-flops coupled to said programmable ring oscillator and having respective inputs for receiving the base clock signal, with each flip-flop being controlled by a respective elementary clock signal; and
- a control circuit coupled to said second set of N flip-flops for receiving respective outputs therefrom.

34. A device according to claim 31, wherein the pulses of the incident pulse signal have a central frequency within a range of 2 to 4 GHz; and wherein the effective sampling frequency is greater than 10 GHz.

35. A device according to claim 31, further comprising a controller for placing said sampler and said digital processor into a standby mode during predetermined time intervals.

* * * * *

UNITED STATES PATENT AND TRADEMARK OFFICE
CERTIFICATE OF CORRECTION

PATENT NO. : 7,386,066 B2  Page 1 of 1
APPLICATION NO. : 10/256282
DATED : June 10, 2008
INVENTOR(S) : Didier Helal, Thierry Arnaud and Fritz Lebowsky It is certified that error appears in the above-identified patent and that said Letters Patent is hereby corrected as shown below:

Column 3, Line 67          Delete: "illustrate"
                           Insert: --illustrated--

Column 4, Line 40-41       Delete: "a position"
                           Insert: --a pulse position--

Column 10, Line 51         Delete: "a few GHz"

Signed and Sealed this

Thirtieth Day of September, 2008

JON W. DUDAS
*Director of the United States Patent and Trademark Office*